(No Model.) 2 Sheets—Sheet 2.
E. G. HASTINGS.
DITCHING AND TILE LAYING MACHINE.
No. 340,505. Patented Apr. 20, 1886.
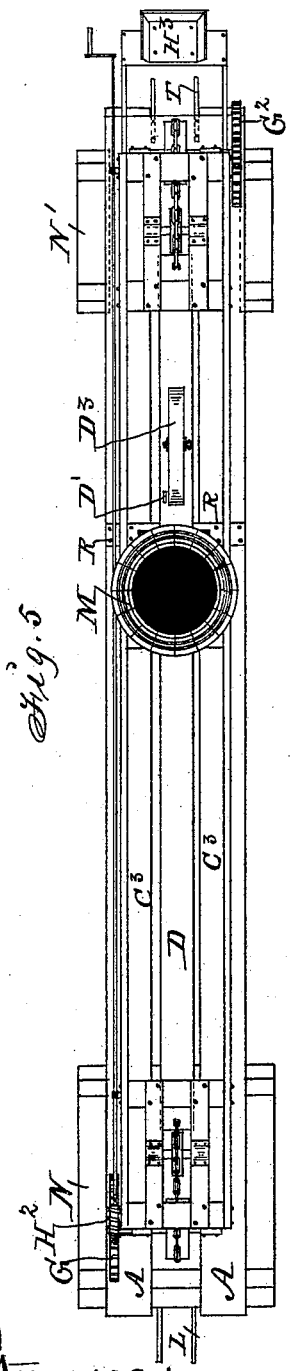
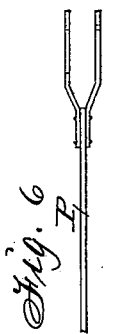
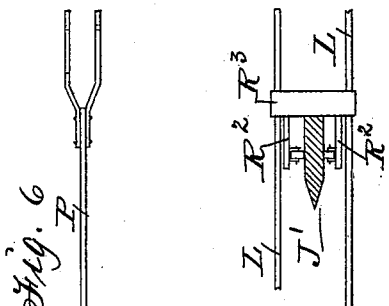
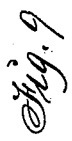
Witnesses:
C. S. Hudgens
R. H. Orwig.
Inventor:
Edwin G. Hastings,
By Thomas G. Orwig, Att'y.

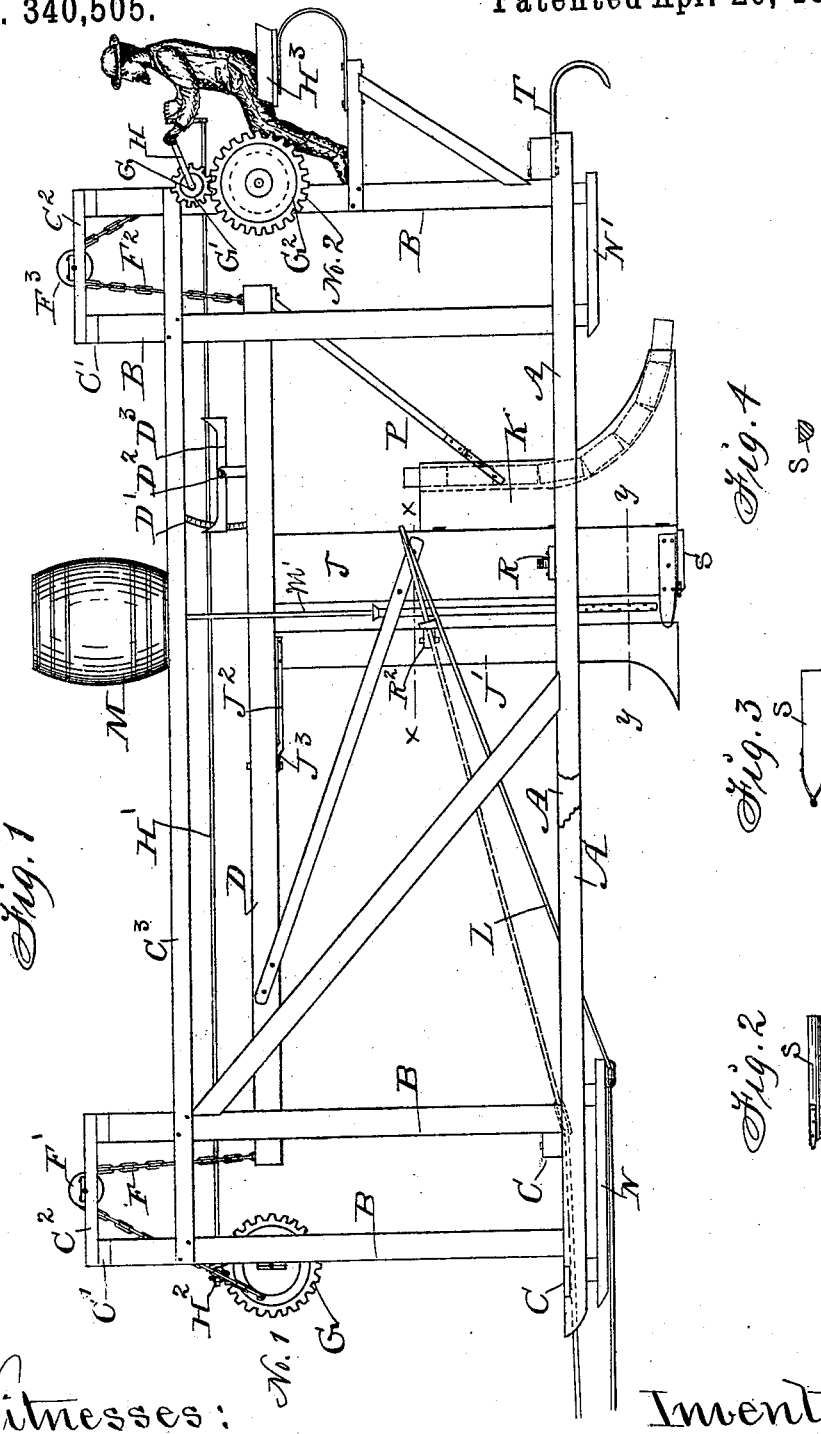

UNITED STATES PATENT OFFICE.

EDWIN G. HASTINGS, OF NEVADA, IOWA, ASSIGNOR OF ONE-HALF TO JAY A. KING, OF SAME PLACE.

DITCHING AND TILE-LAYING MACHINE.

SPECIFICATION forming part of Letters Patent No. 340,505, dated April 20, 1886.

Application filed June 27, 1885. Serial No. 169,930. (No model.)

*To all whom it may concern:*

Be it known that I, EDWIN G. HASTINGS, a citizen of the United States of America, and a resident of Nevada, in the county of Story and State of Iowa, have invented an Improved Tile-Laying Machine, of which the following is a specification.

My object is to save time, labor, and expense in forming drains under ground, as required to prepare wet and swampy lands for cultivation.

My invention consists in the construction and combination of a frame having runners adapted to slide upon the ground, a plow adapted to be adjustably suspended within the sliding frame and to form an open ditch and deposit tiles therein in succession as the frame and plow are jointly advanced, mechanism for raising and lowering the plow relative to the frame and the surface of the ground, a leveling device to maintain a uniform grade at the bottom of the ditch and complete drain, a fountain for keeping the plow wet, and a device for covering tile and closing the ditch, as hereinafter fully set forth.

Figure 1 of my accompanying drawings is a side view of my machine; Fig. 2 a side view, Fig. 3 a top view, and Fig. 4 a transverse section, of a detachable tile-bed former; Fig. 5, a top view of my machine. Fig. 6 is a forked brace. Figs. 7 and 8 are plow-guides. Fig. 9 is a view looking down from the line $x$ $x$ in Fig. 1. Fig. 10 is a view through the line $y$ $y$ of Fig. 1. Fig. 11 is a plow-adjusting device on the under side of the plow-beam.

Jointly considered, these figures clearly illustrate the construction and operation of my complete invention.

A A are the parallel base-pieces of my sliding frame. They are wood plank, about twenty feet long, three inches thick, ten inches wide, and about one foot apart.

B are posts, about four inches square and six feet high, fixed to the planks A.

C are cross-pieces fixed to the planks A.

C' are cross-pieces fixed to the top ends of the posts B.

$C^2$ are pieces fixed on top of the ends of the pieces C'.

$C^3$ are side pieces fixed to the posts B at the front and rear of the frame.

D is a wooden beam, about six inches wide and eight inches thick, suspended between the posts B and horizontal pieces $C^3$ of the sliding frame.

D' represents a scale, and $D^2$ a post fixed on top of the beam.

$D^3$ is a level having sights at its ends, adjustably connected with the post $D^2$ by means of a set-screw, so that its angle relative to the beam can be changed.

No. 1 represents a windlass connected with the front end of the frame and a chain, F, extending from the drum of the windlass upward over a directing-pulley, F', that has its bearings fixed to the center of the cross-pieces $C^2$, and from thence to the front end of the plow-beam D, to which it is attached.

No. 2 represents a windlass attached to the rear end of the frame.

$F^2$ is an endless chain that extends around the drum and over a directing-pulley, $F^3$, to the top of the frame.

G is a shaft mounted in bearings fixed to the frame above the windlass No. 2.

G' is a gear-wheel fixed to the shaft G, to engage a gear-wheel, $G^2$, fixed to the axle of the windlass. A corresponding wheel is fixed to the axle of the windlass No. 1.

H is a crank-handle on the end of the shaft G, by means of which the shaft is rotated, as required, to operate the windlass No. 2.

H' is a rotating shaft that extends horizontally through bearings fixed to the frame from the rear end of the machine to the front, and has a worm, $H^2$, on its front end and a crank on its rear end, by means of which the windlass No. 1 can be readily operated by an attendant upon the seat $H^3$, as required in governing the depth of the plow.

J is an upright preferably made of wood and rigidly fixed to the beam D.

J' is a metal plow hinged to the front of the upright J and adjustably connected with the beam by means of a lever, $J^2$, that has a bridle, $J^3$, at its front end, as clearly shown in Fig. 11, and in such a manner that the point and sharp front edge of the plow can be moved to the right or left of the center of the beam for the purpose of governing the direction of the line of advance.

$J^4$ is a set-screw that extends through the bridle $J^3$ and the plow-beam, and serves to clamp the bridle and lever fast to the beam.

K is a chute fixed to the rear face of the upright or block J, through which chute pieces of tile are successively passed to the bottom of the ditch formed by the plow. The thickness of the upright J may vary as required to suit tiling of different diameter. It is detachably connected with the plow-beam, so that the same machine can be used to form ditches of different widths and adapted for tiling of different sizes.

L is a hitching device adjustably connected with the plow in such a manner that when power is applied by means of a chain and capstan it will draw the plow forward and downward.

M represents a reservoir or fountain carried on the sliding frame in such a position relative to the space between the upright J and plow J' that water will flow from the fountain through a tube, M', to keep the point of the plow wet and to soak the ground so that it will be more readily packed on the opposite sides of the plow, as required to produce an open ditch for the admission of the pieces of tiling that descend through the chute K as the machine is advanced.

N represents a sled, about five feet long and four feet wide, fixed under the front end of the frame. N' is a corresponding sled, about three feet long, fixed under the rear end of the frame. By means of these sleds the machine can be advanced over an open ditch to operate the plow in the bottom of the ditch. When the bottom of the frame is thus elevated from the surface of the ground, it will not interfere with the action of the plow as it raises and displaces the ground while making a ditch.

P is a forked brace fixed to the rear end of the beam D and the chute K.

R represents wheel-bearers fixed on top of the planks A, to extend inward horizontally, so that the wheels will come in contact with the side faces of the upright J, to aid in keeping the plow perpendicular.

$R^2$ (clearly shown in Fig. 9) are wheel-bearers that extend forward horizontally from a bar, $R^3$, that is fixed to the draft-rods L in such a manner that wheels carried at their sides will come in contact with the side faces of the plow J', to aid in keeping the plow perpendicular.

S represents a detachable tile-bed former on the lower end of the upright J. It performs the function of a mole in shaping the bottom of the ditch to correspond with the shape of the tile.

T represents a curved cutter fixed to the rear end of each plank A in such a manner that it will penetrate the bank on each side of the ditch and loosen the packed surface of the ground, so that the ditch will be partially closed and the drain-tile covered as the machine is advanced.

In the practical operation of my machine, after it is in position for starting, I set a stake in advance of the machine and in the line selected for the laying of a drain, and then adjust the level $D^3$ relative to the beam D, as required, to indicate the grade or inclination that the drain is to have. As the machine is advanced I remain on the seat $H^3$, and frequently sight over the level to the top of the stake or a mark on the stake to see that a uniform inclination is maintained at the bottom of the ditch by keeping the level in range with the stake or mark, and whenever any variation or deflection, either up or down, is indicated, I raise or lower the plow accordingly by means of the windlasses.

From the description of the construction and function of each element and sub-combination in my machine the unitary actions of all the parts and the utility of my complete invention will be obvious to persons familiar with the laying of drain-tile by machinery.

I am aware that ditch-making plows have been adjustably connected with carriages of tile-laying machines of various forms; but my manner of constructing a rigid carriage-frame and providing it with rigidly-fixed sleds at its opposite ends, and my manner of suspending a plow-beam carrying an adjustable plow, and governing the same by means of mechanism within the reach of the operator on a seat at the rear end of the frame, is novel and greatly advantageous.

I claim as my invention—

1. The combination of a rigid carriage-frame having sleds rigidly fixed under its ends, and a suspended and adjustable beam carrying a ditching-plow at its central portion, and a hitching device adjustably connected with the plow and rigid frame to operate in the manner set forth, for the purposes stated.

2. A rigid carriage-frame provided with fixed sleds under its ends, and having a windlass at its front end, a windlass at its rear end, and a plow-beam suspended in the frame by means of chains connected with the drums of the windlasses, arranged and combined to operate in the manner set forth, for the purposes specified.

3. The frame composed of the planks A, posts B, cross-pieces C C' $C^2$, side pieces, $C^3$, sleds, N and N', the plow-beam D, the windlasses Nos. 1 and 2, and mechanism for operating them, constructed, arranged, and combined, substantially as shown and described, to carry and operate a ditching-plow and tile-laying device.

4. In combination with the frame and sleds, as described, the gear-shaft G G', windlass No. 2, crank-shaft H' $H^2$, gear-wheel G, windlass No. 1 and chain, and the plow-beam D, substantially as shown and described.

5. The bearers R and $R^2$, carrying wheels in their ends, the upright J, the draft-rods L, and the plow J', suspended in the rigid frame having runners fixed under its ends, arranged and combined substantially as shown and described, for the purposes stated.

6. The rigid carriage-frame having fixed sleds under its ends, the beam D, the upright J, the adjustable plow J', and the adjustable device $J^2 J^3$, arranged and combined to operate in the manner set forth, for the purposes stated.

7. A tile-laying machine composed of a rigid frame having sleds fixed under its ends, having a windlass at each end, and mechanism to operate both windlasses from the rear end, a ditching-plow, and tile-laying chute fixed to a plow-beam suspended in the frame and connected with the windlasses by means of chains, an adjustable level and fixed scale carried on the plow-beam, a water-reservoir and water-distributing tube, and a hitching device, substantially as shown and described.

EDWIN G. HASTINGS.

Witnesses:
T. H. STEPHENS,
H. C. MCINTOSH.